United States Patent
Kawazu

(10) Patent No.: US 6,454,653 B1
(45) Date of Patent: Sep. 24, 2002

(54) GAME APPARATUS, GAME DISPLAY CONTROL METHOD, AND COMPUTER-READABLE STORAGE MEDIUM

(75) Inventor: Akitoshi Kawazu, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,983

(22) Filed: Mar. 29, 2000

(30) Foreign Application Priority Data

Mar. 30, 1999 (JP) .......................................... 11-090150

(51) Int. Cl.⁷ ................................................ A63F 13/00
(52) U.S. Cl. ................................ 463/43; 463/8; 463/30
(58) Field of Search ............................. 463/7, 8, 30–34, 463/42, 43

(56) References Cited

U.S. PATENT DOCUMENTS

| | | | |
|---|---|---|---|
| 5,390,937 A | 2/1995 | Sakaguchi et al. .............. | 463/2 |
| 5,736,982 A | 4/1998 | Suzuki et al. ............... | 345/706 |
| 6,165,073 A | 12/2000 | Miyamoto et al. .............. | 463/1 |
| 6,168,524 B1 | 1/2001 | Aoki et al. ..................... | 463/31 |
| 6,217,446 B1 | 4/2001 | Sanbongi et al. ............ | 345/419 |
| 6,283,861 B1 | 9/2001 | Kawai et al. .................. | 463/32 |
| 6,347,994 B1 | 2/2002 | Yoshikawa et al. ......... | 345/473 |
| 6,371,856 B1 | 4/2002 | Niwa ............................ | 463/1 |

FOREIGN PATENT DOCUMENTS

JP         05189035 A         7/1993

OTHER PUBLICATIONS

"Monthly Game Walker", vol. 4, No. 9 (whole No. 35), p. 59; Kadokawa Shoten Publishing Co., Ltd., Sep. 1, 1997.

Primary Examiner—Jessica Harrison
Assistant Examiner—John Hotaling, II
(74) Attorney, Agent, or Firm—Moser, Patterson & Sheridan, L.L.P.

(57) ABSTRACT

A game apparatus determines a contact situation between a player character and an enemy character on a display screen (step S200), identifies a contact pattern for the determined contact situation (step S300), determines an arrangement pattern based on the contact pattern identified (step S400), and displays the characters in a battle scene according to the determined arrangement pattern.

15 Claims, 16 Drawing Sheets

ARRANGEMENT PATTERN 0

170

| ARRANGMENT PATTERN TABLE ||
|---|---|
| ARRANGEMENT PATTERN 0 ||
| CHARACTER 0 | ( 4,5 ) |
| CHARACTER 1 | ( 3,4 ) |
| CHARACTER 2 | ( 3,6 ) |
| CHARACTER 3 | ( 2,5 ) |
| CHARACTER 4 | ( 7,4 ) |
| CHARACTER 5 | ( 7,6 ) |
| CHARACTER 6 | ( 9,6 ) |
| CHARACTER 7 | ( 9,4 ) |
| ARRANGEMENT PATTERN 1 ||
| CHARACTER 0 | ( 4,5 ) |
| CHARACTER 1 | ( 3,6 ) |
| CHARACTER 2 | ( 3,4 ) |
| CHARACTER 3 | ( 2,5 ) |
| CHARACTER 4 | ( 7,6 ) |
| CHARACTER 5 | ( 7,4 ) |
| CHARACTER 6 | ( 9,4 ) |
| CHARACTER 7 | ( 9,6 ) |
| ARRANGEMENT PATTERN 2 ||
| ⋮ ||
| ARRANGEMENT PATTERN 7 ||

FIG. 5

ARRANGEMENT PATTERN 0

FIG. 6

ARRANGEMENT PATTERN 1

FIG. 7

ARRANGEMENT PATTERN 2

FIG. 8

ARRANGEMENT PATTERN 3

FIG. 9

ARRANGEMENT PATTERN 4

ARRANGEMENT PATTERN 5

ARRANGEMENT PATTERN 6

ARRANGEMENT PATTERN 7

| CONTACT SITUATION TABLE ||
|---|---|
| MOVING MODE | NORMAL WALKING OR DASH |
| CONTACTING PARTY | PLAYER OR ENEMY |
| CONTACT DIRECTION | FRONT OR BACK OR SIDE |

GAME APPARATUS, GAME DISPLAY CONTROL METHOD, AND COMPUTER-READABLE STORAGE MEDIUM

BACKGROUND OF THE INVENTION

1. Field of the Invention

The present invention relates to a game apparatus for controlling display of a game screen, a game display control method, and a storage medium containing a program for causing a computer to perform the game display control method.

2. Related Background Art

Role playing games (RPGs) are classified as one type of computer games. In ordinary RPGs, a player plays a role of a main character and plays a game toward a given objective while experiencing virtual adventures. In many RPGs, opposition characters (hereinafter called "enemy characters") hostile to the character controlled by the player (hereinafter called a "player character") are provided, and the player character combats the enemy characters who obstruct accomplishment of the objective, thereby developing a story.

In such RPGs, when the player moves the player character in the game on the screen and when contact between the player character and an enemy character occurs, the display is switched to a battle scene and a battle is started between the player and enemy characters in the battle scene.

In RPGs of this type, the positions of the player and enemy characters on the display screen in the battle scene are predetermined. For example, if the number of the player characters simultaneously involved in the battle are at most three, a set of three character positions are preset and the player characters are placed at the fixed positions in the battle scene, respectively. Thus, there is no surprise or unexpectedness as to the arrangement of the characters in battle, and the player may feel discontented at that point.

SUMMARY OF THE INVENTION

Having considered the above point, it is an object of the present invention to provide a game apparatus, a game display control method and a computer-readable storage medium that may control the arrangement of character images on a screen to increase amusement value of the game.

A game apparatus according to the present invention controls a battle between characters on a screen displayed on a display device. The apparatus comprises a detector for detecting contact between character images on a first screen; a situation determiner for determining a situation of the detected contact; an arrangement determiner for determining arrangement of the character images to be displayed on a second screen based on the situation; and a screen generator for generating the second screen in which the character images are displayed in the determined arrangement. The first screen may be a non-battle screen such as a movement screen, and the second screen may be a battle screen. The apparatus positions and displays the characters in the battle scene based on the contact situation between the characters.

A game display control method according to the present invention controls a battle between characters on a screen displayed on a display device. The method comprises detecting contact between character images on a first screen; determining a situation of the detected contact; determining arrangement of the character images to be displayed on a second screen based on the situation; and generating the second screen in which the character images are displayed in the determined arrangement. The first screen may be a non-battle screen such as a movement screen, and the second screen may be a battle screen. According to the method, the characters in the battle scene can be displayed based on the contact situation between the characters. Performing the method by a computer can provide effects similar to effects of the game apparatus described above. Therefore, hardware such as computers or the like can be utilized as the game apparatus in accordance with the invention by performing the method with the hardware.

A computer-readable storage medium according to the present invention stores a game program for controlling a battle between characters on a screen displayed on a display device. The program causes a computer or a game system to perform a process comprising detecting contact between character images on a first screen; determining a situation of the detected contact; determining arrangement of the character images to be displayed on a second screen based on the situation; and generating the second screen in which the character images are displayed in the determined arrangement. The first screen may be a non-battle screen such as a movement screen, and the second screen may be a battle screen. By use of the storage medium, the characters in the battle scene can be displayed based on the contact situation between the characters. The game apparatus in accordance with the present invention can be realized, in one embodiment, by executing the program stored in the storage medium on a suitable computer. Therefore, such storage media make it possible to distribute, license and/or sell the program easily as software products separately from hardware. When this software is used by suitable hardware such as computers or the like, the present invention can be implemented easily by the hardware.

A computer data signal according to the present invention is a signal which carries a game program for controlling a battle between characters on a screen displayed on a display device. The program causes a computer to perform a process comprising detecting contact between character images on a first screen; determining a situation of the detected contact; determining arrangement of the character images to be displayed on a second screen based on the situation; and generating the second screen in which the character images are displayed in the determined arrangement. The computer data signal may be compressed and/or encrypted. Use of the computer data signal permits the above program to be transferred to computers, whereby the characters in the battle scene can be displayed based on the contact situation between the characters.

A computer program product according to the present invention controls a battle between characters on a screen displayed on a display device. The computer program product comprises computer code for detecting contact between character images on a first screen; computer code for determining a situation of the detected contact; computer code for determining arrangement of the character images to be displayed on a second screen based on the situation; and computer code for generating the second screen in which the character images are displayed in the determined arrangement. By using the computer program product in a suitable computer system, the characters in the battle scene can be displayed based on the contact situation between the characters.

BRIEF DESCRIPTION OF THE DRAWINGS

FIG. 5 is a diagram explaining an example of the arrangement pattern table to store a set of arrangement pattern data set for one map.

Figures 6, 7:
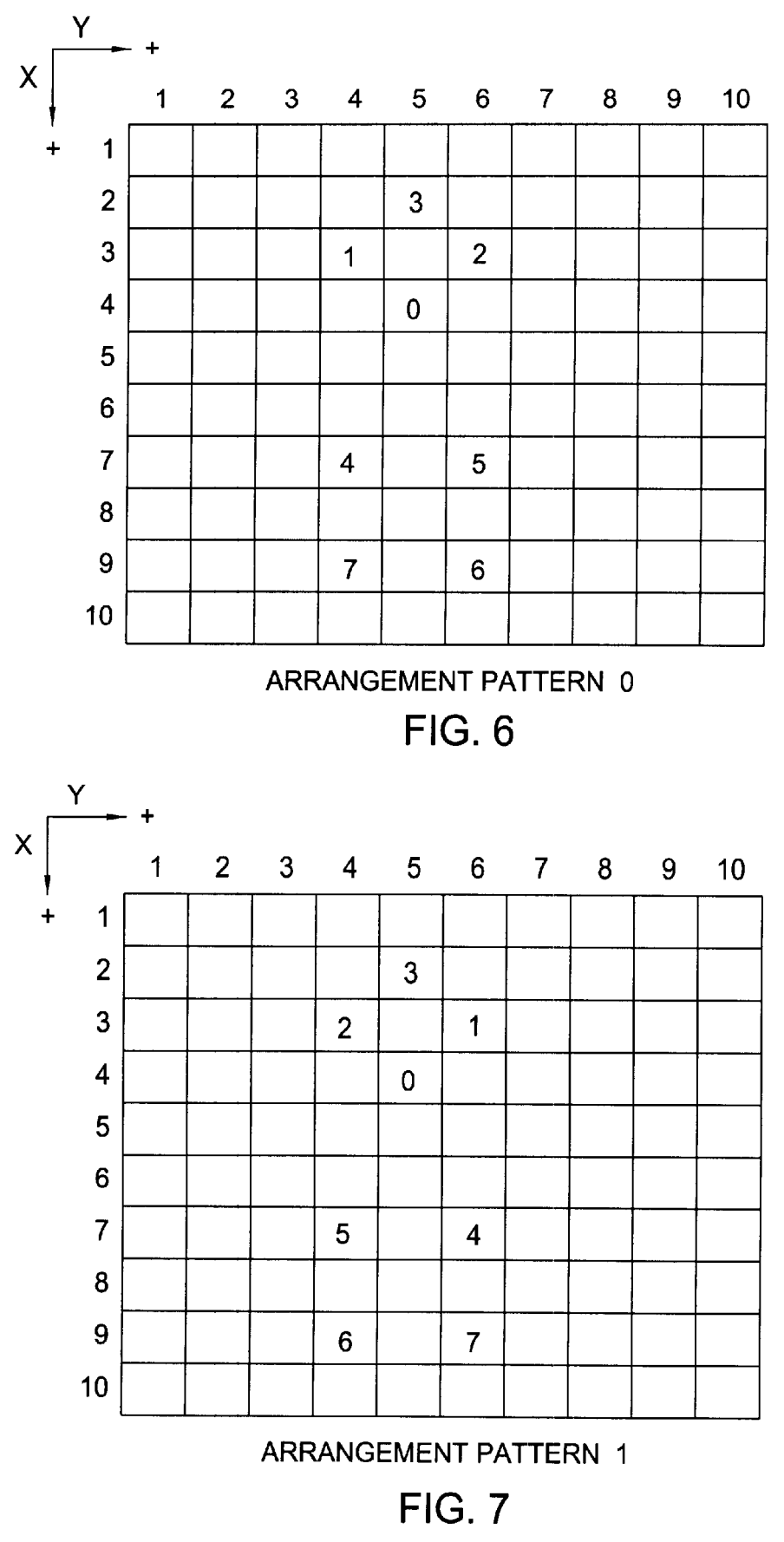

FIG. 6 is a diagram explaining an example of arrangement pattern 0.

FIG. 7 is a diagram explaining an example of arrangement pattern 1.

Figures 8, 9:
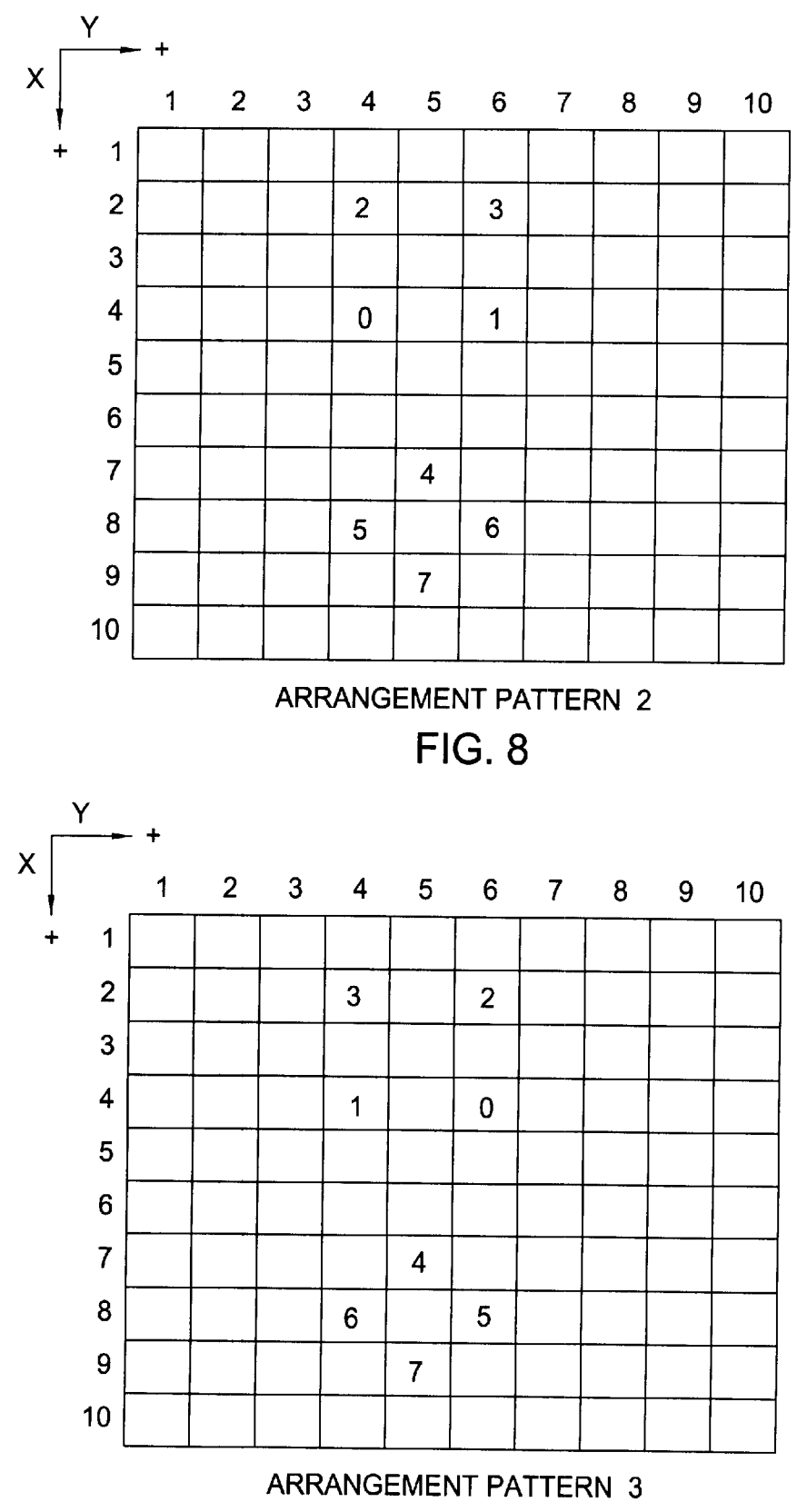

FIG. 8 is a diagram explaining an example of arrangement pattern 2.

FIG. 9 is a diagram explaining an example of arrangement pattern 3.

DESCRIPTION OF THE PREFFERED EMBODIMENTS

Figure 1:
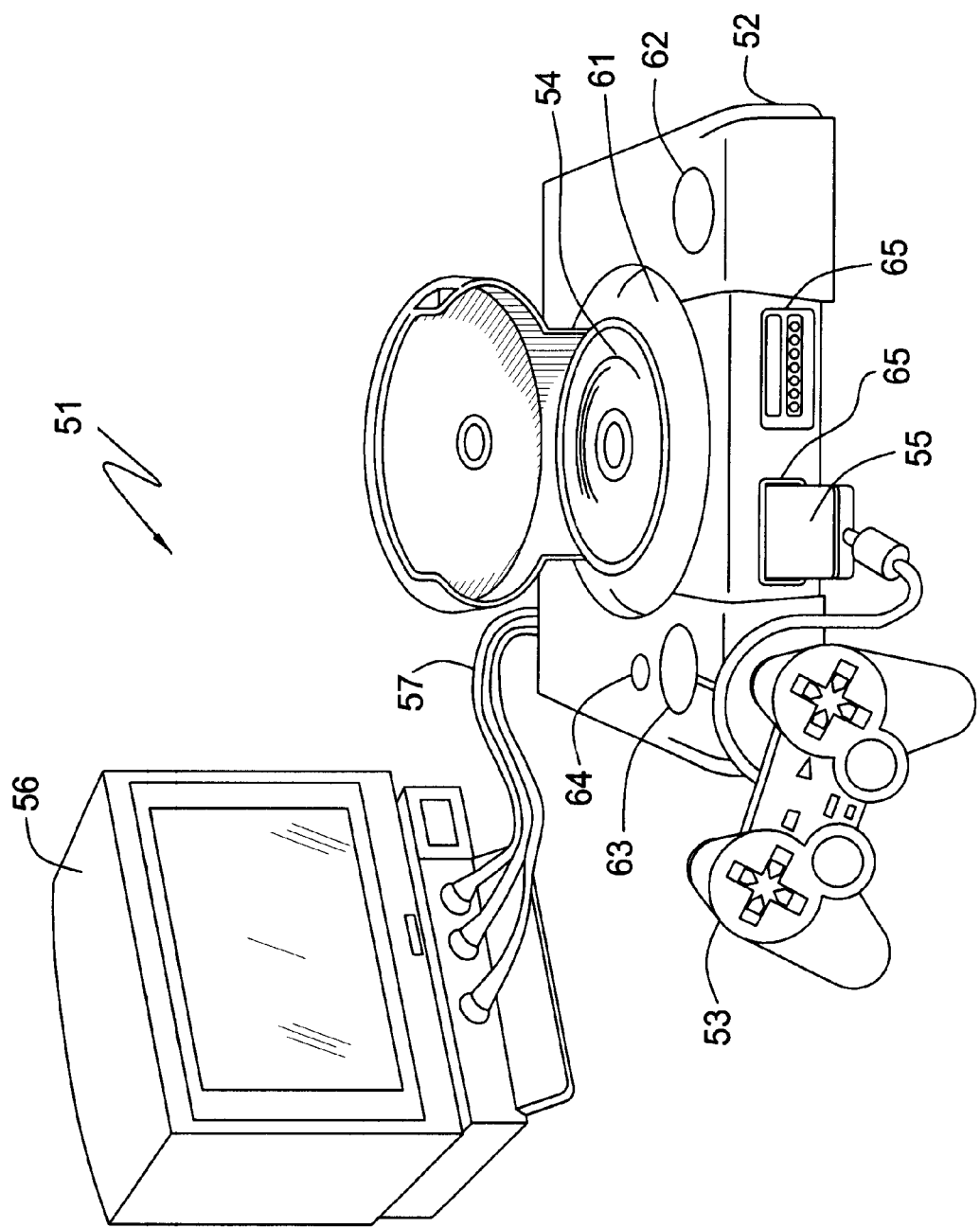
FIG. 1 is a diagram showing the overall structure of a game system according to an embodiment of the present invention.

Embodiments of the present invention will be described in detail by reference to the accompanying drawings. For easier understanding, the same reference numerals will be used for the same elements common to the drawings as much as possible. The following will describe examples of application of the present invention to game systems for home use.

FIG. 1 shows the overall structure of a video game system in one embodiment of the present invention. The game system 51 includes a game unit 52 for carrying out principal functions of the game system 51 and controlling a game implemented by the game system 51, a controller 53 as an input device for entering a command into the game unit 52, a CD-ROM (Compact Disc Read Only Memory) 54 for storing programs, image data, sound data, etc., for implementing operations concerning the game described hereinafter, a memory card 55 for saving game data such as midway progress data, environment setting data, and the like of the game, and a monitor display 56 provided with a sound output function, which receives a video signal and a sound signal from the game unit 52 to provide video display and sound output according to the contents of the game. The game unit 52 is the main body of the game system for home use. The game unit 52 has a function of a game display control device for controlling a game screen on the monitor display 56.

The game unit 52 includes a CD-ROM drive (not shown) having a disc holder 61 for receiving the CD-ROM 54, an open button 62 for opening the disc holder 61, a power button 63, and a reset button 64. Further, in the front surface of the game unit 52 there are connector portions 65 including two slots to which the controller 53 and the memory card 55 are attached respectively. The controller 53 and memory card 55 are detachably attached through this connector portion 65 to the game unit 52.

In the rear surface of the game unit 52 there is an AV output portion (not illustrated) to which an AV (Audio and Visual) cable 57 is connected. The game unit 52 and the monitor display 56 are coupled to each other through the AV cable 57. A television system for home use, a CRT (Cathode Ray Tube) monitor, or other display devices can be used as the monitor display 56.

Figure 2:
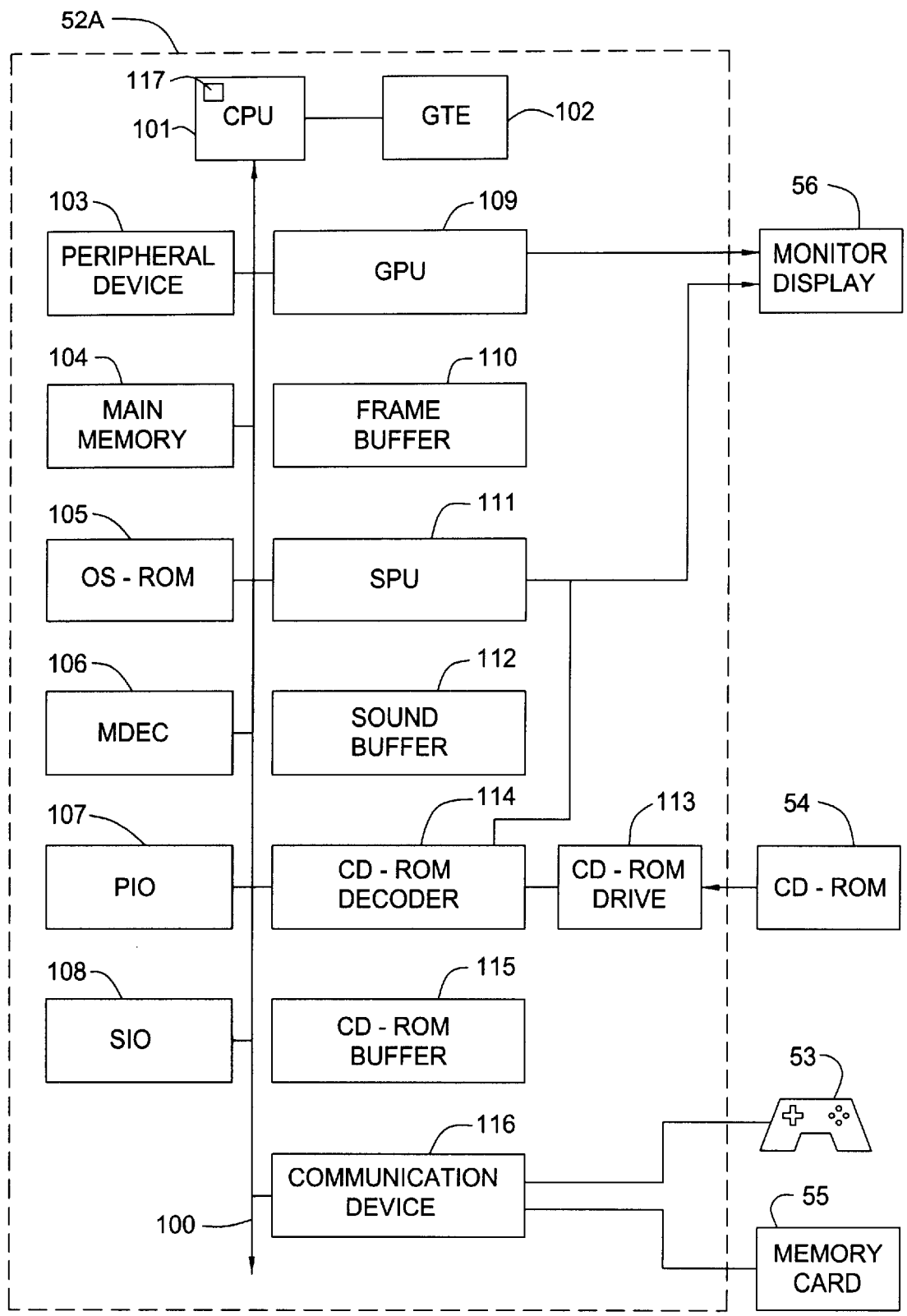
FIG. 2 is a block diagram showing the constituent elements of the game unit, together with peripheral devices thereof, according to the first embodiment.

FIG. 2 is a block diagram showing constituent elements of one embodiment of the game unit 52A of FIG. 1, together with peripheral devices thereof. The game unit 52A is equipped with a CPU (Central Processing Unit) 101, a GTE (Geometric Transform Engine; graphics data generating processor) 102, a peripheral device 103, a main memory 104, an OS-ROM (Operating System ROM) 105, an MDEC (Motion DECoder; data expanding engine) 106, a PIO (Parallel Input/Output; extended parallel Port) 107, an SIO (Serial Input/Output; extended serial port) 108, a GPU (Graphics Processing Unit; graphics drawing operation processor) 109, a frame buffer 110, an SPU (Sound Processing Unit; sound reproducing processor) 111, a sound buffer 112, a CD-ROM drive 113, a CD-ROM decoder 114, a CD-ROM buffer 115, and a communication device 116. The CPU 101 incorporates a timer counter 117 for controlling the time in the game unit.

The CPU 101, peripheral device 103, main memory 104, OS-ROM 105, MDEC 106, PIO 107, SIO 108, GPU 109, SPU 111, CD-ROM decoder 114, and communication device 116 are connected to each other via a bus 100.

The CPU 101 controls each part of the game unit 52A, based on an OS (operating system) stored in the OS-ROM 105 and based on the programs, data, etc., read from the CD-ROM 54 and saved in the main memory 104.

Specifically, the CPU 101 reads the game program, modeling data of a three-dimensional model, etc., from the CD-ROM 54 and transfers the read information to the main memory 104. The CPU 101 also reads a color look-up table (CLUT: Color Look-Up Table), texture pattern data, etc. from the CD-ROM 54, transfers the read information to the frame buffer 110, and-sends a command to draw an image, to the GPU 109.

The GPU 109 performs an operation for carrying out the display in the monitor display 56 under control of the CPU 101. Specifically, the GPU 109 responds to the command from the CPU 101 to carry out a modeling operation, a rendering operation, etc., based on coordinate data and color information acquired by the GTE 102 and based on the CLUT, the texture pattern data, etc., stored in the frame buffer 110. Then, the GPU 109 stores image data obtained by projecting an arbitrary area in a virtual three-dimensional space constructed by placement of the three-dimensional model onto the two-dimensional space, into the frame buffer 110. A video signal including this image data in synchronism with a synchronous signal is created, and thereafter, the video signal is supplied to the monitor display 56, which enables an image or a picture according to the contents of the game to be displayed on the screen of the monitor display 56. In this way, the CPU 101, the main memory 104, the GPU 109, and the frame buffer 110 compose one screen generator or a display control device of the monitor display 56.

After reading the sound data from the CD-ROM 54 and transferring the data to the main memory 104 and to the SPU 111, the CPU 101 sends a command to reproduce the sound to the SPU 111. In response to this command, the SPU 111 executes a modulation operation, a reproduction operation, etc., with these sound data. Further, the SPU 111 creates a sound signal by, superimposing this sound reproduction data on audio reproduction data transferred from the CD-ROM decoder 114, and sends the sound signal to the monitor display 56 which enables internal loudspeakers (not illustrated) of the monitor display 56 to output BGM (BackGround Music) or sound effect, etc., according to the contents of the game.

The CPU 101 also generates a clock signal based on a timing signal supplied from an oscillator (not illustrated). The CPU 101 can perform a timer operation by counting this clock signal by use of the internal timer counter 117.

The GTE 102, which is connected to the CPU 101, can operate as a co-processor of the CPU 101. The GTE 102 carries out arithmetic operations of matrix and vector of the fixed point type in response to an operation command from the CPU 101. The arithmetic operations include, for example, coordinate computations in movement, rotation, expansion, contraction, etc. for each of the three-dimensional coordinate data forming the three-dimensional model, computations for perspective transform to two-dimensional coordinate data, luminance computations to compute luminance at each part according to a type of a light source set on a virtual basis and to compute luminance at each part according to the distance from the light source, the angle, the position of a view point, and etc.

The peripheral device 103 executes interrupt control and control concerning transmission of DMA (Direct Memory Access). The main memory 104 is a storage device which stores the program executed by the CPU 101 and data necessary for execution thereof. The memory configuration and stored data of the main memory 104 will be detailed hereinafter. The OS-ROM 105 stores the OS for carrying out the basic control of the game unit 52A, such as the OS kernel and the boot loader.

The MDEC 106 performs an expansion operation of compressed image. Specifically, the MDEC 106 expands compressed image data, for example, by successively applying the decoding operation of Huffman coding, the inverse quantization operation, the inversed discrete cosine transform (Inversed Discrete Cosine Translation; IDCT) operation, and so on to the compressed image data of still image and dynamic image of JPEG (Joint Photographic Coding Experts Group), MPEG (Moving Picture Expert Group), or the like. The PIO 107 is an extended port for parallel data, and the SIO 108 is an extended port for serial data. The timer 117 controls the time of the game unit 52A.

The GPU 109 is a sub-processor capable of operating independently of the CPU 101. The GPU 109 performs the modeling operation of a three-dimensional model composed of a plurality of polygons, the rendering operation, etc., based on the coordinate data and color information acquired by the GTE 102 and based on the CLUT and texture pattern data stored in the frame buffer 110, in response to a drawing command from the CPU 101. Then, the GPU 109 stores the image data resulting from projection of an arbitrary area in a virtual three-dimensional space constructed by the placement of the three-dimensional model, onto the two-dimensional space, on the frame buffer 110. The term "polygons" herein means minimum elements of graphics constituting the three-dimensional model and the minimum elements involve polygonal planes such as triangles, rectangles, and so on.

The GPU 109 also generates a video signal including the stored image data or the image data transferred from the main memory 104 in synchronism with a synchronous signal, and supplies this video signal to the monitor display 56.

A dual port RAM can be used as the frame buffer 110. The frame buffer 110 has a drawing area and a display area. The drawing area stores the image data drawn by the GPU 109 or the image data transferred from the main memory 104. The display area stores the image data to be displayed on the monitor display 56. The GPU 109 can alternately switch between these drawing area and display area in accordance with a field rate used on the occasion of displaying graphics.

The frame buffer 110 can store the color look-up table (CLUT) to be referenced for designation of colors, the texture pattern data for texture mapping, etc., in addition to the above.

The SPU 111 is a sub-processor capable of operating independently of the CPU 101. The SPU 111 reproduces the sound in response to a command from the CPU 101. For reproducing the sound, the SPU 111 carries out a variety of modulation operations including a volume adjustment operation, pitch transformation, interval adjustment, envelope, reverberation, etc. with sound data of ADPCM (Adaptive Differential Pulse Code modulation) stored in the sound buffer 112 as occasion arises. Further, the SPU 111 carries out the reproduction operation to generate a sound signal and then sends this sound signal to the monitor display 56.

The SPU 111 also generates a sound signal by superimposing the audio reproduction data transferred from the CD-ROM decoder 114 on the sound reproduction data reproduced by the SPU 111, and then sends this sound signal to the monitor display 56.

The sound buffer 112 is a memory for temporarily storing the sound data of ADPCM transferred from the main memory 104 in response to a command from the CPU 101. The sound buffer 112 can also be used as a work area when the SPU 111 executes the reverberation operation or as a buffer memory when the SPU 111 transfers the sound data for manipulation and other operation to the main memory 104.

For driving and controlling the CD-ROM 54, the CD-ROM drive 113 can read the coded data stored in the CD-ROM 54. The CD-ROM decoder 114 decodes the data read from the CD-ROM 54 by the CD-ROM drive 113, performs operations such as an error correction, and then transfers the decoded program and data to the main memory 104, to the SPU 111, and so on. The CD-ROM drive 113 is provided with an internal sound source and mixer (both not illustrated) and thus also provides the function of reproducing the audio data. The CD-ROM buffer 115 is a memory for temporarily storing data for transfer.

The controller 53 and the memory card 55 are connected to the communication device 116. The communication device 116 controls data transfer between the controller 53/the memory card 55 and parts of the game unit 52A, such as the CPU 101 and the main memory 104.

The controller 53 is an input device or a control device manipulated by the player. The player can enter instructions into the game unit 52A by manipulating the controller 53. The controller 53 sends various operation signals according to the input by the player's manipulation of the controller, via the communication device 116 to the game unit 52A. The controller 53 is equipped with a plurality of input buttons, including a start button to be used for output of a start command of game or the like, direction keys for entry of direction information, and so on. Optionally, the controller 53 includes a vibration function. Namely, the controller 53 incorporates a motor and the motor is actuated with reception of a predetermined control signal from the game unit 52A, to vibrate the controller 53 as a whole.

The memory card 55 is comprised of a flash memory and is used for storing the game data.

In the game unit 52A, a large volume of image data and sound data needs to be transferred between the main memory 104 and, the frame buffer 110, the sound buffer 112, the CD-ROM buffer 115, and the MDEC 106, for example, on the occasion of display of image or on the occasion of output of sound. Therefore, the so-called DMA transfer, which is direct transfer of data between two devices under control of the peripheral device 103 without intervention of the CPU 101, is carried out in order to perform the data transfer at a high rate.

For playing the game, the player opens the disc holder 61 by pressing the open button 62 down, then sets the CD-ROM 54 in the CD-ROM drive 113 of the game unit 52A, and thereafter closes the disc holder 61. When in this state the player depresses the power button 63 or when the player depresses the reset button 64 in the case of power on, the CPU 101 performs a predetermined activation operation and thereafter reads the game program and data recorded in the CD-ROM 54 to execute the game.

The game unit 52A performs operations according to the game program recorded in the CD-ROM 54 in the game system 51 and controls the screen displayed on the monitor display 56. The CPU 101 provides the functions of the detecting means (or detector), the situation determining means (or situation determiner), and the arrangement determining means (or arrangement determiner) in the present invention. The CPU 101 and GPU 109 provide the function of the screen generating means (or screen generator) in the present invention. The CD-ROM 54 and main memory 104 are storage media in the present invention. The above also applies to the second embodiment described hereinafter.

The following will describe game control procedures of the game system 51 in the present embodiment, focusing on the display control by the unit 52A. In the following description, it is assumed that the operations carried out by the CPU 101 also include the operations actually carried out by the GTE 102. In practice the game program and necessary data are read successively from the CD-ROM 54 and transferred to the main memory 104 in accordance with the progress of processing under control of the CPU 101, but detailed description below may sometimes omit about the reading from the CD-ROM 54, the transfer of data to the main memory 104, and so on, as one skilled in the art understands such transfer of information are performed.

Figure 3:
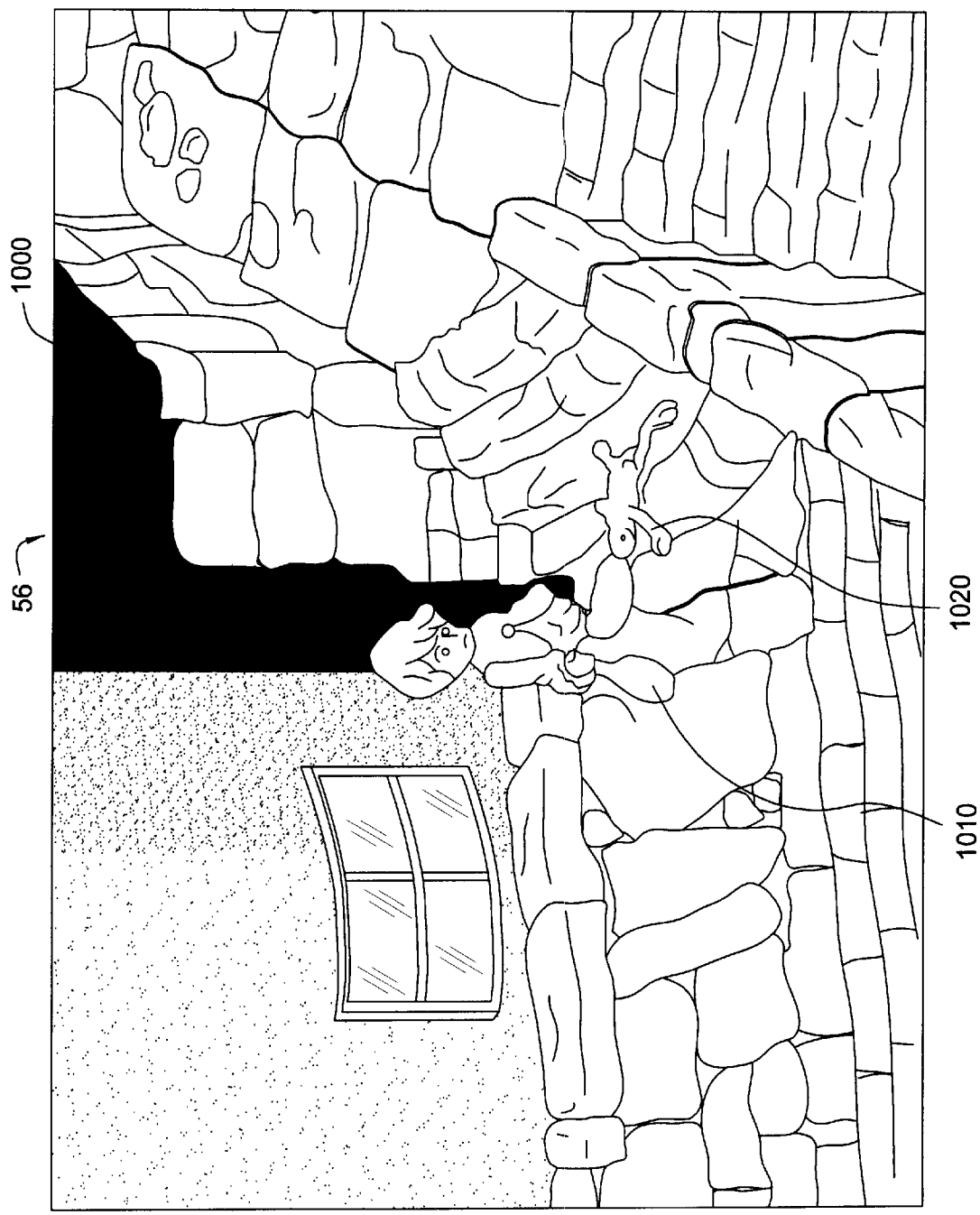
FIG. 3 is a diagram showing an example of the game screen.
Figure 4:
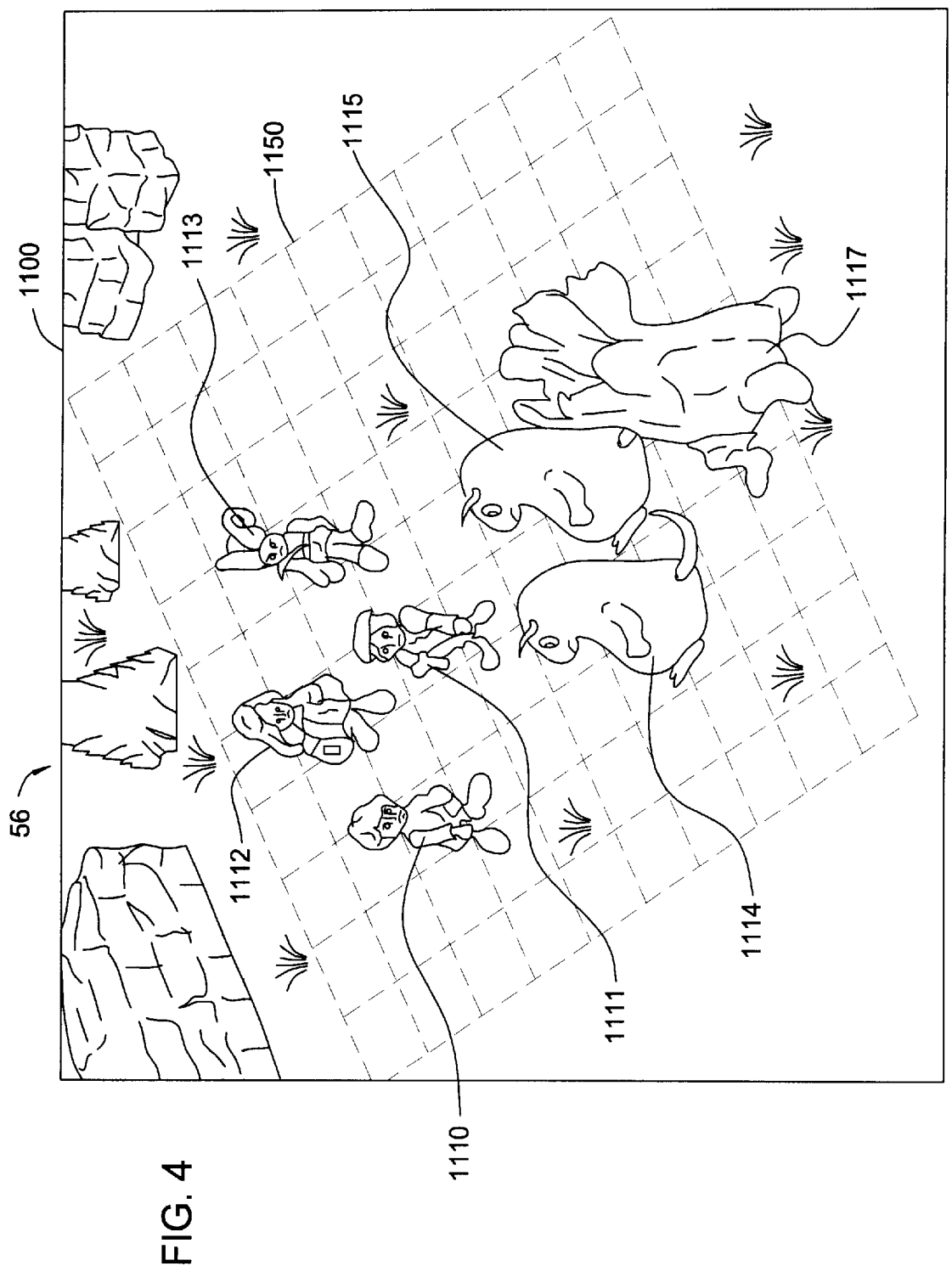
FIG. 4 is a diagram showing another example of the game screen.
Figure 10:
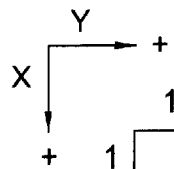
FIG. 10 is a diagram explaining an example of arrangement pattern 4.
Figure 11:
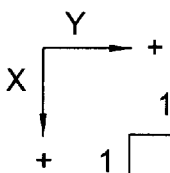
FIG. 11 is a diagram explaining an example of arrangement pattern 5.
Figure 12:
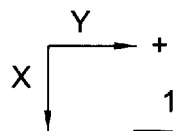
FIG. 12 is a diagram explaining an example of arrangement pattern 6.
Figure 13:
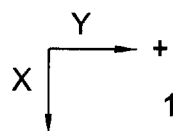
FIG. 13 is a diagram explaining an example of arrangement pattern 7.

In the present embodiment, the game system 51 implements the RPG. FIG. 3 and FIG. 4 are drawings showing examples of game screens in the RPG of the present embodiment, wherein FIG. 3 shows a movement screen 1000 and FIG. 4 a battle screen. 1100. As illustrated in FIG. 3, in the case of the RPG of the present embodiment, the movement screen 1000, appearing to overlook a terrain, is displayed on the monitor display 56. When the player gives a command through the controller 53, a character image 1010 representing a player character, or alternatively a group of player characters (which is typically called a "party"), starts moving according to the command on the displayed terrain. A character image 1020 representing an enemy character or a party of enemy characters is also displayed on the terrain and moves on the terrain according to the game program. On the screen 1000, an image of the front, the side, or the back of the character representing the party is displayed according to a moving direction of the party. In the present embodiment, the character image 1010 of the player moves at a predetermined speed in response to the player's manipulation of the direction keys of the controller 53, and additionally, the character image 1010 can also be moved at a higher speed by manipulating the direction keys while pressing a predetermined button of the controller 53. In the following, this higher-speed movement will be called "dash."

Just as in the case of the ordinary computer games, once contact occurs between the character image 1010 of the player and the character image 1020 of the enemy on the movement screen 1000 as illustrated in FIG. 3, the display is switched to the screen for battle as illustrated in FIG. 4 (hereinafter referred to as a "battle screen") to start the battle in the present embodiment. On the battle screen 1100, as illustrated in FIG. 4, the display monitor displays images representing player characters 1110 to 1113 and enemy characters 1114, 1115, and 1117 belonging to their respective parties. Model data as the background of the battle screen is preliminarily set in association with the enemy party. When the player party encounters the enemy party, that is, when the contact occurs between the character image of the player and the character image of the enemy on the movement screen, scene data (a map number, etc.) stored in the CD-ROM 54 in association with the enemy party indicated by the enemy image is read, and a battle scene is constructed using the scene data. In the present embodiment, the maximum number of player characters and enemy characters appearing in the battle scene is four each.

Each map has grid information represented by grid 1150, a 10×10 grid as illustrated in FIG. 4, and eight arrangement patterns to define where the player characters and enemy characters are to be located in the grid are set for each of maps. The grid is typically not displayed on the screen in fact.

FIG. 5 is a drawing explaining an example of a arrangement pattern table which stores a set of arrangement pattern data set for one map. As described hereinafter, this arrangement pattern table 170 is stored in an arrangement pattern data storage area 104c of the main memory. In this table, each character N is identified by a character number N (N is an integer of 0 to 7) and associated with coordinates $(X_n, Y_n)$ of the grid where the character is to be located, in each arrangement pattern.

FIG. 6 to FIG. 13 are diagrams explaining each arrangement pattern stored in the arrangement pattern table 170 of FIG. 5. The grid in each diagram corresponds to the grid 1150 shown on the battle screen of FIG. 4. In these diagrams, numbers 0 to 3 on the grid are numbers assigned to the player characters in the player party, while numbers 4 to 7 are numbers assigned to the enemy characters in the enemy party. These numbers indicate basic arrangement orders of the characters in the parties. Specifically, it means that a character with a smaller number assigned is placed forward in the party (as related to party movement) whereas a character with a larger number assigned is placed back (as related to party movement). The player can optionally determine or change the order of arrangement of the player characters.

As illustrated in FIG. 6 to FIG. 13, the arrangement patterns 0 to 3 represent arrangement at which both player characters and enemy characters of the respective parties confront each other in a battle formation according to the numbers assigned to the respective characters. The arrangement patterns 4 and 5 are arrangement at which the player party barely maintains its battle formation but fails to stand against the front of the enemy party because of a surprise attack of the enemy from an unexpected direction against the player party. In each of these arrangement patterns, the character of the number 0, which set as a forward of the player party is not located in the front,row of the party to confront the enemy party. The arrangement patterns 6 and 7 represent arrangement at which the player characters and enemy characters are mixed because of disarray of the battle formations of the respective parties occurring when the player party encounters the enemy party under a dash. In the present embodiment, a set of arrangement patterns as described above is set for each of the maps and stored in the form of data. As detailed hereinafter, which arrangement pattern in the arrangement pattern set is selected for the placement of characters is determined based on a situation upon a start of the battle (i.e., upon the contact) between the player party and the enemy party.

Figure 14:
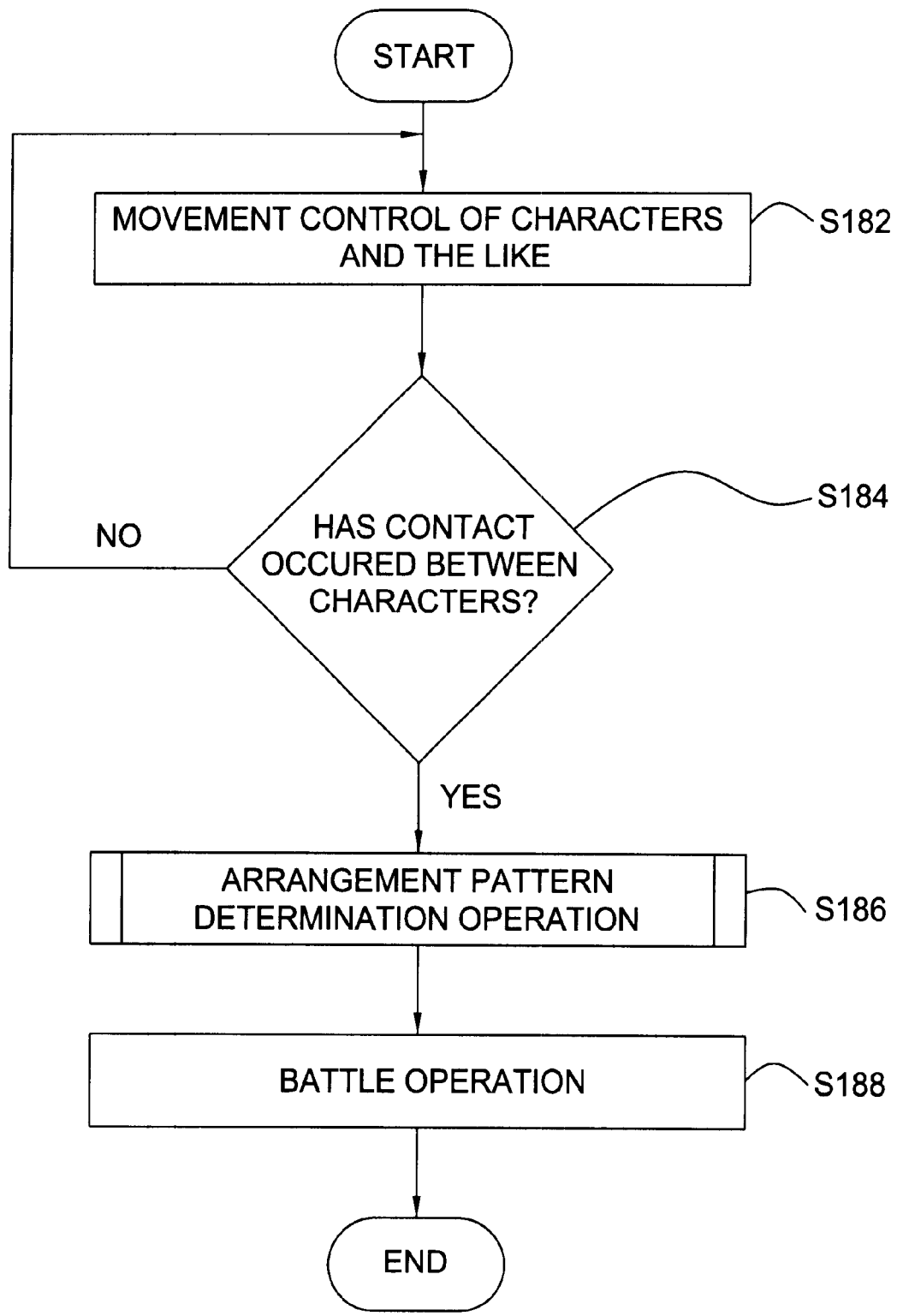
FIG. 14 is a flowchart showing principal steps of the game control operation in one embodiment of the present invention.

FIG. 14 is a flowchart showing principal steps in the game control operation in the present embodiment. For easier understanding, interrupts of special operations (for example, display of movie scenes) are omitted from this flowchart. In this game, after execution of an operation (step S182) of controlling movement of the characters on the screen, the CPU detects whether contact occurred between the player character and the enemy character on the screen (step S184). When contact is detected, an arrangement pattern is determined according to the situation of the detected contact (step S186), and thereafter, the battle operation is carried out according to the determined arrangement pattern (step S188). The movement control is repeated until contact has been detected.

Figures 15, 16:
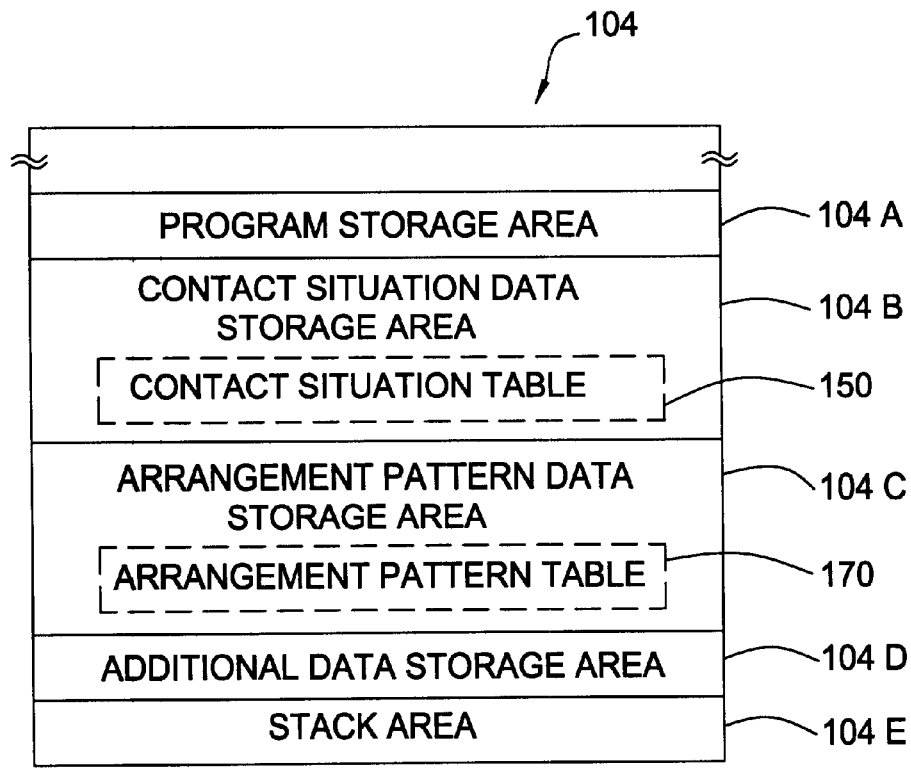
FIG. 15 is a diagram explaining the configuration of main memory 104.
FIG. 16 is a diagram explaining the contact situation table 150.

FIG. 15 is a diagram explaining the configuration of the main memory 104 for the arrangement pattern determination operation. As illustrated in this figure, the main memory 104 includes a program storage area 104a, a contact situation data storage area 104b, a arrangement pattern data storage area 104c, and an additional data storage area 104d and further includes a stack area 104e used by the program.

The program storage area 104a stores the game program read from the CD-ROM 54.

The contact situation data storage area 104b stores data indicating the contact situation between the player party and the enemy party. Specifically, it stores the data indicating the following: a movement mode (normal movement or dash) of the player party at the contact, the party which caused the contact against the other party, and a direction (either the front, the back, or the side) from which the contacting party has made the contact against the other party. These data are produced or updated after the contact between the character images of the player and the enemy on the movement screen.

The arrangement pattern data storage area 104c stores the arrangement pattern table (for example, the arrangement pattern table 170 illustrated in FIG. 5) including the arrangement pattern sets corresponding to the various maps. Once the contact occurs between the character images of the player and the enemy on the movement screen, the arrangement pattern table associated with the enemy character will be read from the CD-ROM 54 into the arrangement pattern data storage area 104c.

The additional data storage area 104d stores additional data necessary for operation by the program. These data includes, for example, image data having virtual three-dimensional information for display of the movement screen, two-dimensional image data for the background, and the sound data for output of the sound effect and the like.

The following will mainly describe operations carried out after detection of contact between the player party image and the enemy party image at step S184 of FIG. 14. After detecting the contact between the player party and the enemy party, the main program, which carries out moving operation of the player party and the enemy party, etc., determines the situation of the contact. The contact situation is characterized by the following three factors.

The first factor is that the moving mode of the player party upon the contact is either "normal movement" or "dash." In the present embodiment, a flag indicating the moving mode of the player party is set according to manipulation of the controller 53, and this flag is on during dash of the player party but off during the normal movement. Whether the moving mode of the player party is the "normal movement" or the "dash" is determined by reference to this flag.

The second factor is which of the two types of parties, the player party or the enemy party, caused the contact against the other party. This can be determined by identifying the party that was moving at detection of contact. In general, whether contact occurred or not is determined after each movement operation of the player and enemy parties. Thus, the contacting party can be identified according to whether the contact was detected after the movement operation of the player party or of the enemy party. If contact is detected after the movement operation of the player party, the player party is the contacting party. If contact is detected after the movement operation of the enemy party, the enemy party is the contacting party.

The third factor is the direction (front, back or side) relative to the contacted party from which the contacting party made contact. This can be determined by checking a relative relation between orientations of the image representing the contacting party and the image representing the contacted party in the movement screen. In the present embodiment, party images viewed from eight directions are prepared for each party in order to represent various orientations of each of the parties, and the party image that fits the moving direction of the party is selectively displayed from these images in the movement screen. Therefore, the contact direction can be identified by checking which image data was displayed for each of the player party and the enemy party at the contact and checking the relative relationship between orientations of the parties indicated by the image data. The details about what relationship corresponds to the forward, backward, or side contact are predetermined by the game program.

The contact situation determined as described above is stored in the form of the contact situation table 150 in the contact situation data storage area 104b of the main memory. FIG. 16 is a diagram explaining the contact situation table 150. As illustrated, this table stores the data indicating that the moving mode is either the normal walking or the dash, that the contacting party is either the player or the enemy, and that the contact direction is either forward, backward, or side.

After the contact situation is determined and the contact situation table 150 is prepared as described above, the battle scene is constructed. At this time, data necessary for the display of the battle screen and for the computation of the result of the battle is read from the CD-ROM 54 and the main memory 104. An operation to determine the arrangement pattern of the characters is carried out before the actual display of the battle screen.

Figure 17:
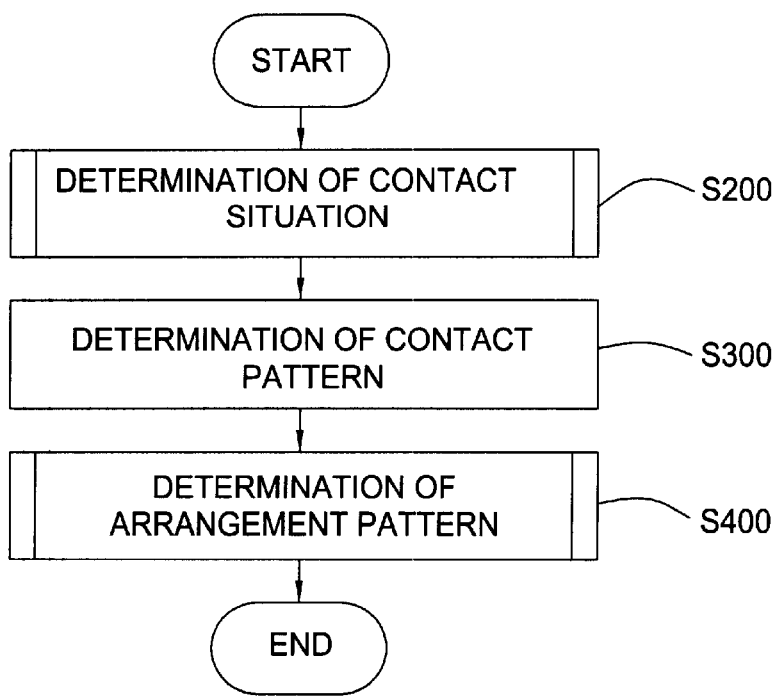
FIG. 17 is a flowchart showing the arrangement pattern determination operation.

FIG. 17 is a flowchart showing the arrangement pattern determination operation (step S186 of FIG. 14). As illustrated, a first step of this operation is to determine the contact situation between the player party and the enemy party (step S200). A second step is to determine which of the preset contact patterns corresponds to the determined contact situation (step S300). A final step is to identify an arrangement pattern preliminarily associated with this contact pattern (step S400).

Figure 18:
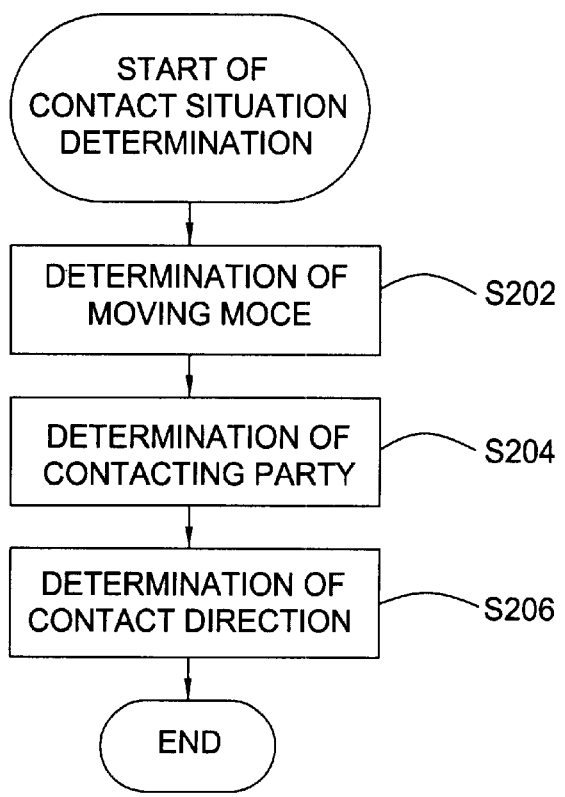
FIG. 18 is a flowchart showing the contact situation determination operation.

FIG. 18 is a flowchart showing the details of the contact situation determination operation at step S200 of FIG. 17. Carried out herein are determination of the moving mode (step S202), determination of the contacting party (step S204), and determination of the contact direction (step S206). These determination operations are achieved by acquiring the data associated with the "moving mode," the "contacting party," and the "contact direction" by reference to the aforementioned contact situation table 150. This completes the determination of the contact situation (step S200). It is noted that the steps S202, S204, and S206 can be rearranged in any arbitrary order.

Then the processing unit determines which of the preset contact patterns corresponds to the determined contact situation from the data acquired as described above (step S300). The table below is a table explaining correspondence between the contact situations and the contact patterns.

TABLE 1

| | Contact situation | | |
|---|---|---|---|
| moving mode | contacting party | Contact direction | Contact pattern |
| dash | player | — | 0 |
| — | enemy | Back | 1 |
| — | enemy | Side | 2 |
| — | — | — | 3 |

As presented in this table, the contact situations are classified under four contact patterns and numbers of 0 to 3 for identification are assigned to the respective patterns. It is understood that the invention contemplates using more or less contact patterns. The contact pattern 0 is a contact situation in which "the player party is the contacting party and the player party on the dash caused the contact with the enemy party." The contact pattern 1 is a contact situation in which "the enemy party is the contacting party and the enemy party caused the contact with the player party from the back." The contact pattern 2 is a contact situation in which "the enemy party is the contacting party and the enemy party caused the contact with the player party from the side." Contact situations other than these are determined as situations corresponding to the contact pattern 3. In this way, the identifying operation of the contact pattern is completed (step S300).

Next, an arrangement pattern of the characters in the battle screen is determined according to the identified contact pattern (step S400). The following will describe the arrangement pattern determination operation corresponding to each of the identified contact patterns.

Figure 19:
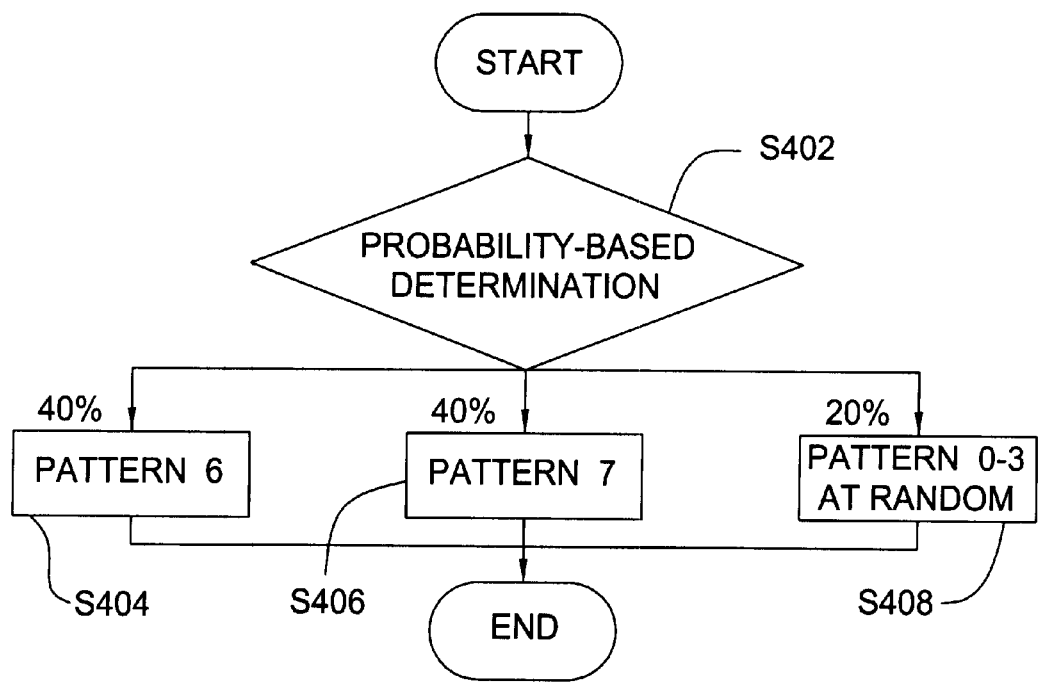
FIG. 19 is a flowchart showing the arrangement pattern determination operation for contact pattern 0.

FIG. 19 is a flowchart showing the arrangement pattern determination operation carried out when the number of the contact pattern is identified as 0. In this case, the arrangement pattern is determined by a probability-based determination (step S402). Specifically, the arrangement pattern is determined to be pattern 6 at the probability of 40% (step S404) and pattern 7 at 40% (step S406), otherwise the arrangement pattern is determined at random from patterns 0 to 3 (step S408). As seen from this, in the case of contact pattern 0, the arrangement pattern is likely to be pattern 6 or 7. Namely, when the player party goes into contact with the enemy party during the dash, the arrangement in which the player characters and the enemy characters are mixed is likely to be provided.

Figure 20:
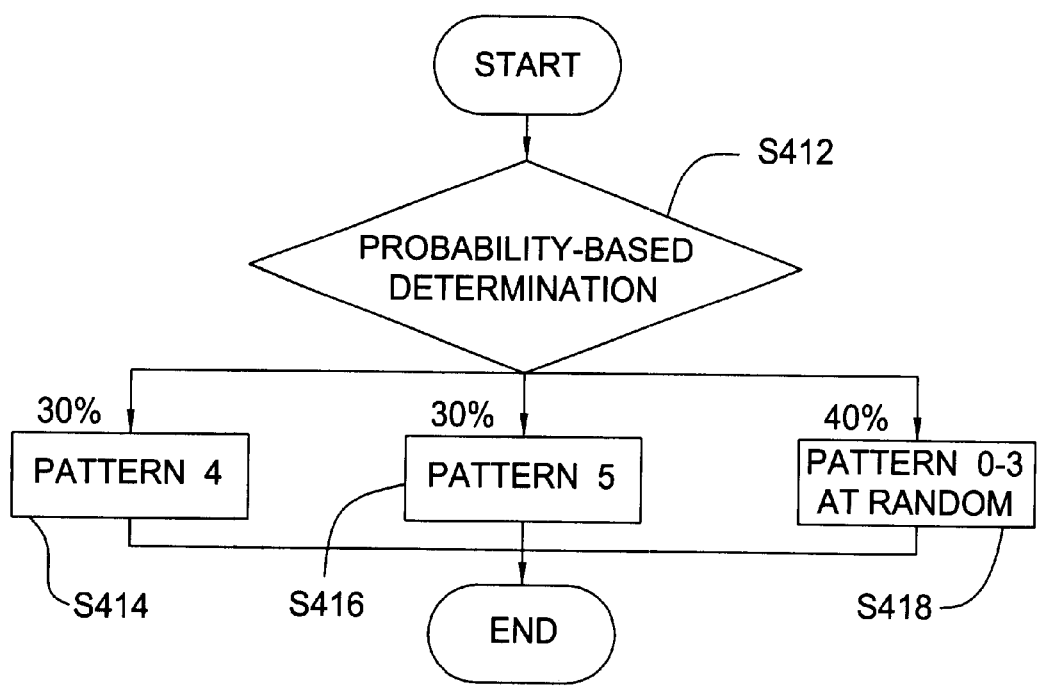
FIG. 20 is a flowchart showing the arrangement pattern determination operation for contact pattern 1.

FIG. 20 is a flowchart showing the arrangement pattern determination operation carried out when the number of the contact pattern is identified as 1. In this case, the arrangement pattern is determined to be pattern 4 at the probability of 30% (step S414) and pattern 5 at 30% (step S416), otherwise the arrangement pattern is determined at random from patterns 0 to 3 (step S418). As seen from this, in the case of contact pattern 1, the arrangement pattern is likely to be pattern 4 or 5. Namely, when the enemy party goes into contact with the player party from the back, the arrangement in which the player party fails to take the position that the enemy party is in front of the player party is likely to be provided.

Figure 21:
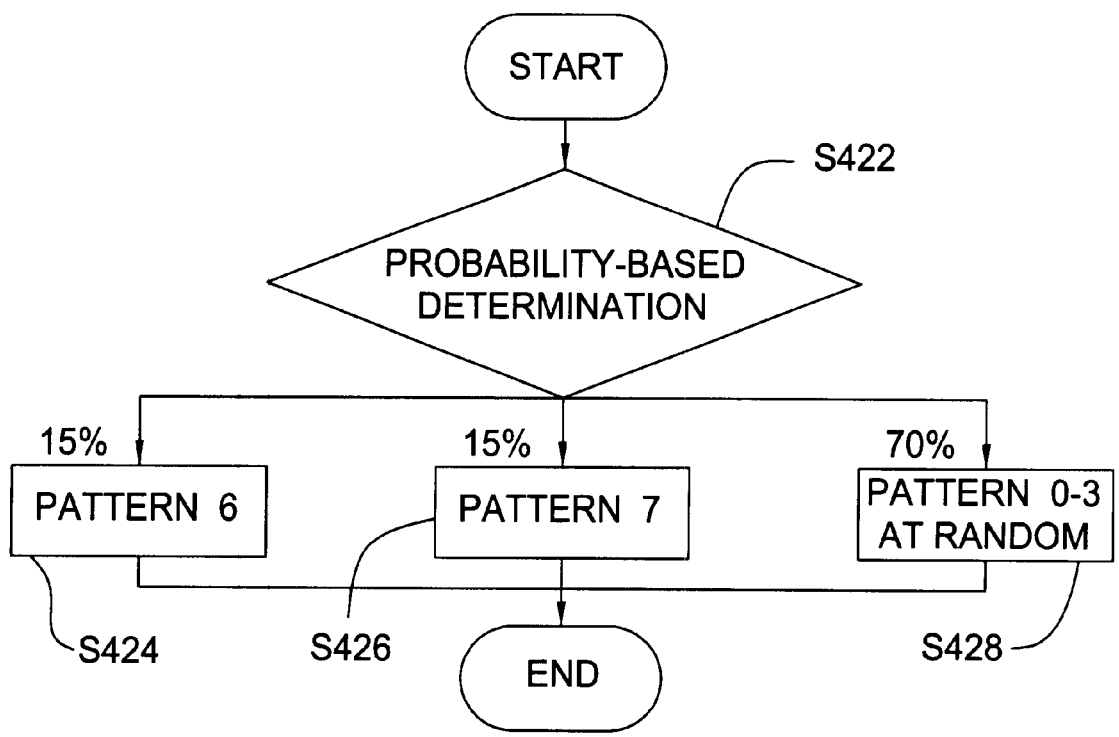
FIG. 21 is a flowchart showing the arrangement pattern determination operation for contact pattern 2.

FIG. 21 is a flowchart showing the arrangement pattern determination operation carried out when the number of the contact pattern is identified as 2. In this case, the arrangement pattern is determined to be pattern 4 at the probability of 15% (step S424) and pattern 5 at 15% (step S426), otherwise the arrangement pattern is determined at random from patterns 0 to 3 (step S428). As seen from this, though the arrangement pattern may be pattern 4 or 5 in the case of contact pattern 2, the probability is lower than that in the case of contact pattern 1. Namely, when the enemy party goes into contact with the player party from the side, the player party may still fail to take the position that the enemy party is in front of the player party; however the probability for failing to take such position is lower than that in the case of the contact from the back.

Figure 22:
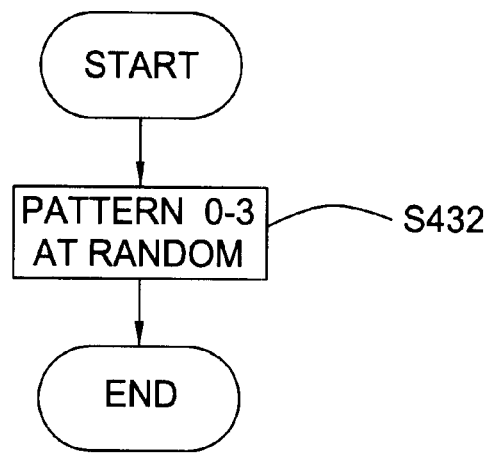
FIG. 22 is a flowchart showing the arrangement pattern determination operation for contact pattern 3.

FIG. 22 is a flowchart showing the arrangement pattern determination operation carried out when the number of the contact pattern is identified as 3. In this case, the probability-based determination is not carried out and the arrangement pattern is determined at random from patterns 0 to 3 (step S432). When the contact between the player and enemy parties occurred under the ordinary situation rather than the specific situations described above, the arrangement at the battle are set so that the player characters and the enemy characters face each other in their respective battle formations.

The arrangement pattern is identified according to the contact situation between the player party and the enemy party as described above (step S400), whereby the arrangement pattern determination operation (FIG. 17) is completed. It is understood that the invention contemplates other associations of contact situation and arrangements as well as other probability values corresponding to the arrangement patterns.

After this, the game unit 52A generates a screen on which the player and enemy characters are placed in the arrangement pattern (for example, one of the arrangement patterns illustrated in FIG. 6 to FIG. 13) determined as described above, and displays the characters in the arrangement pattern on the display monitor 56. For example, FIG. 4 shows the characters displayed in arrangement pattern 4.

After this, the game unit 52A performs the operation of computing the result of the battle. In this operation, the game unit 52A may consider the distance (for example, the number of dots) on the screen between the attack side character and the defense side character at the computation of attack power of the characters.

As described above, the game unit 52A of the present embodiment can implement the character placement in the battle scene according to the contact situation between the player character and the enemy character, i.e., according to the encounter situation with the enemy character. As a result, the player can understand the encounter situation visually, which can enhance the realism of the game. If the distance between the player and enemy characters is considered in the computation of parameters (attack power, etc.) concerning the battle, the arrangement of the characters will affect the battle and the battle result will change according to the start situation of the battle, thus increasing the realism of the game.

Figure 23:
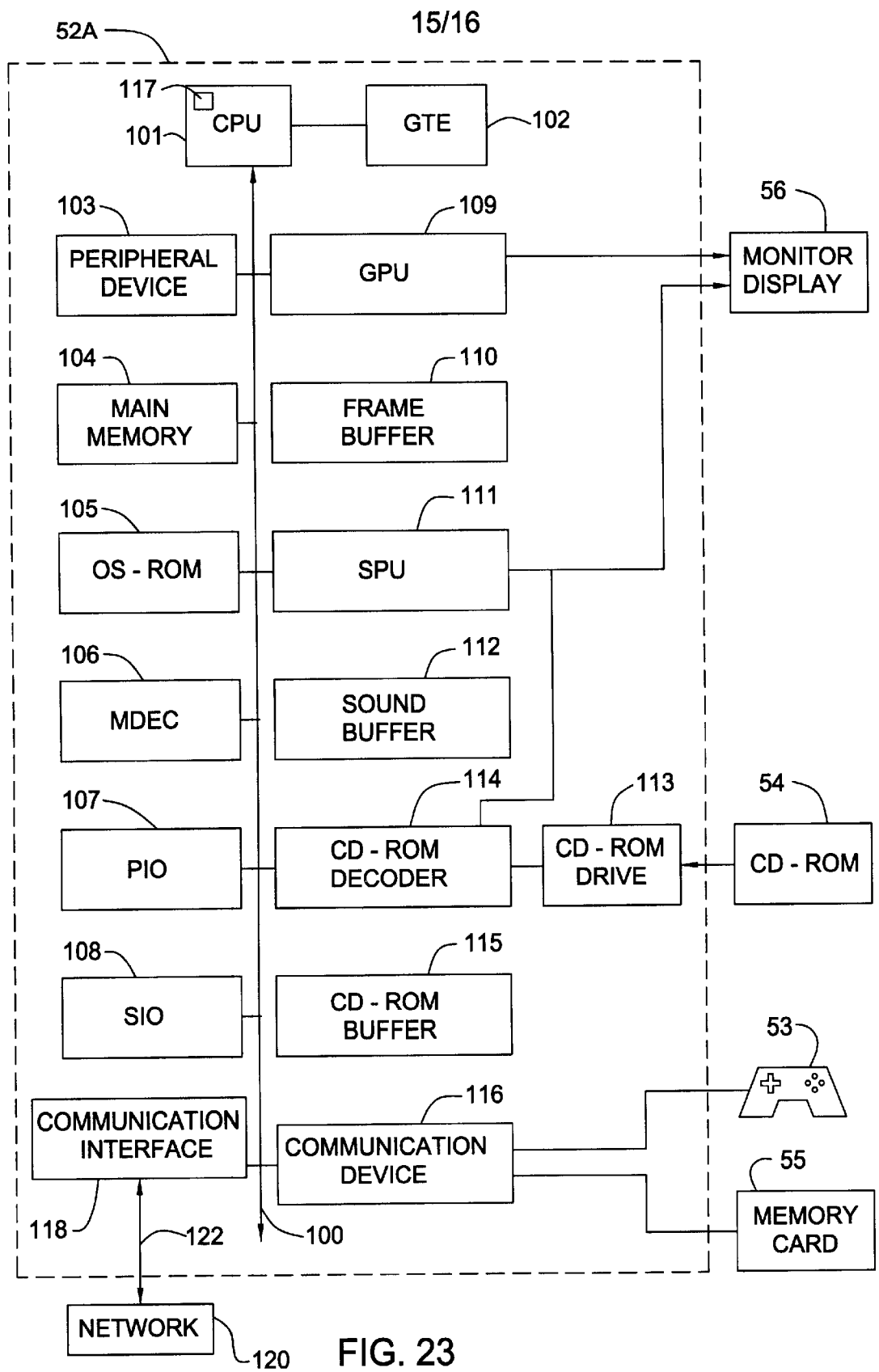
FIG. 23 is a block diagram showing the constituent elements of the game unit, together with peripheral devices thereof, according to a second embodiment.

The following will describe another embodiment according to the present invention. The present embodiment is also applied to the RPG. The structure of the game system in the present embodiment is illustrated in FIG. 1. FIG. 23 is a block diagram, similar to FIG. 2, showing the circuit configuration of the game unit 52B and the periphery thereof according to the present embodiment. The present embodiment differs from the embodiment shown in FIG. 2 in that the game unit 52B is provided with a communication interface 118. The communication interface 118 is a circuitry for information exchange with another device via a network 120 and is connected to the network 120 via a communication line 122 as necessary.

Figure 24:
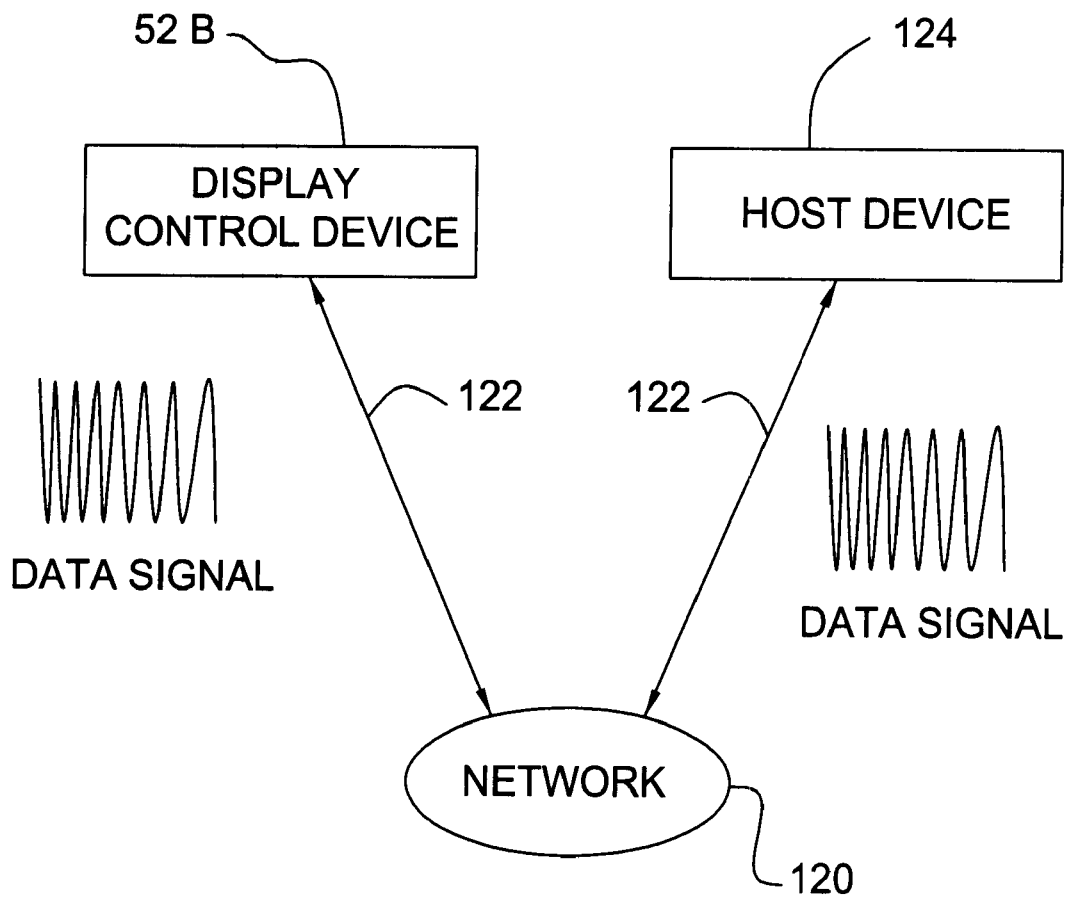
FIG. 24 is a diagram showing connection between the game unit and the network.

The game unit 52B presents the same effects as the unit 52 of the first embodiment, and further has an additional function. Namely, because of the communication interface 118, the game unit 52B can receive the program and data implementing the present invention in the form of a computer data signal from a host device 124 via the network 120 as illustrated in FIG. 24 to store the program and data in storage areas in the main memory 104 and use them. The computer data signal is generated by modulating carrier wave (for example, in frequency or in phase) according to the data stream. Further, it is also possible to record all or part of the program and data for realizing the present invention in a memory of another device connected via the communication line 122 and the network 120 and allow the game unit 52B to use this program and data via the communication line 122 and the network 120.

The present invention has been specifically described based on the embodiments thereof, but it should be noted that the present invention is by no means intended to be limited to the above embodiments but a variety of modifications and changes can be made within the scope of the claims without departing from the sprit of the invention. For example, as to the steps for the display control according to the present invention, the order thereof can be changed, a step can be eliminated, or a step can be added, without departing from the sprit and scope of the invention.

Though the above embodiments describe application of the present invention to the RPGs, the application range of the present invention is not limited to this type of games. The present invention can also be applied to games of the other types, such as simulation games, adventure games, and so on.

The above embodiments describe the examples in which the present invention was realized using the home game system as a platform. However, the present invention may also be realized using a general purpose computer such as a personal computer or the like, or an arcade game machine as a platform. Further, the present invention may also be realized using a communication terminal such as a cellular phone, a portable remote terminal, or a car navigation system as a platform.

Though the game unit is separated from the display device and the input device in the game systems of the above embodiments, the present invention can also be applied to game systems in which the game unit is integrated with the display device and the input device.

In the above embodiments the program and data for implementing the present invention are stored in a CD-ROM and this CD-ROM is used as a computer-readable information recording medium. It is, however, noted that the information recording medium is not limited to a CD-ROM but it may also be other computer-readable, magnetic or optical recording medium or semiconductor memory, such as a magnetic disc, Digital Video Disc (DVD) or a ROM card.

The program and data for implementing the present invention are not limited to the forms provided by the media such as the CD-ROMs or the like detachable from the game unit and the computer, but may also be provided in the form in which they are preinstalled in a memory of the game unit or the computer. The program and data may also be provided in the form in which they are received from another device connected via a communication line or the like to be recorded in a memory. The program and data may also be compressed and/or encrypted for transmission.

As described above in detail, the present invention permits the character images to be displayed at their locations according to the encounter situation of the characters and thus enhancing the realism of the game to increase the amusingness of the game.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A game apparatus for controlling a battle between characters on a screen displayed oh a display device, said game apparatus comprising:

a detector for detecting contact between character images on a first screen;

a situation determiner for determining a situation of the detected contact;

an arrangement determiner for determining arrangement of the character images to be displayed on a second screen based on the situation; and a screen generator for generating the second screen in which the character images are displayed in the determined arrangement.

2. A game display control method for controlling a battle between characters on a screen displayed on a display device, said game display control method comprising:

detecting contact between character images on a first screen;

determining a situation of the detected contact;

determining arrangement of the character images to be displayed on a second screen based on the situation; and generating the second screen in which the character images are displayed in the determined arrangement.

3. A computer-readable storage medium containing a game program for controlling a battle between characters on a screen displayed on a display device, wherein said game program causes a computer to perform a process comprising:

detecting contact between character images on a first screen;

determining a situation of the detected contact;

determining arrangement of the character images to be displayed on a second screen based on the situation; and generating the second screen in which the character images are displayed in the determined arrangement.

4. The computer-readable storage medium according to claim 3, wherein said determining a situation includes identifying a character which caused the contact.

5. The computer-readable storage medium according to claim 4, wherein said determining a situation includes identifying a movement mode at the start of said battle from a plurality of preset movement modes of at least one character image at the detected contact.

6. The computer-readable storage medium according to claim 5, wherein said determining a situation includes determining a relative relationship between orientations of the characters at the detected contact.

7. The computer-readable storage medium according to claim 6, wherein said determining a situation includes selecting a contact pattern which fits the determined situation.

8. The computer-readable storage medium according to claim 7, wherein said determining arrangement of the character images determines said arrangement based on the selected contact pattern.

9. The computer-readable storage medium according to claim 8, wherein said determining arrangement includes selecting an arrangement pattern from a plurality of predetermined arrangement patterns.

10. The computer-readable storage medium according to claim 9, wherein the arrangement is selected utilizing a predetermined probability.

11. The computer-readable storage medium according to claim 9, wherein the arrangement is randomly selected.

12. A computer data signal embodied in a transmission medium, said computer data signal containing a game program for controlling a battle between characters on a screen displayed on a display device, wherein said game program causes a computer to perform a process comprising:

detecting contact between character images on a first screen;

determining a situation of the detected contact;

determining arrangement of the character images to be displayed on a second screen based on the situation; and generating the second screen in which the character images are displayed in the determined arrangement.

13. The computer data signal according to claim 12, wherein said computer data signal is a compressed computer data signal.

14. The computer data signal according to claim 12, wherein said computer data signal is an encrypted computer data signal.

15. A computer program product for controlling a battle between characters on a screen displayed on a display device, the computer program product comprising:

computer code for detecting contact between character images on a first screen;

computer code for determining a situation of the detected contact;

computer code for determining arrangement of the character images to be displayed on a second screen based on the situation; and computer code for generating the second screen in which the character images are displayed in the determined arrangement.

* * * * *